Patented Sept. 22, 1931

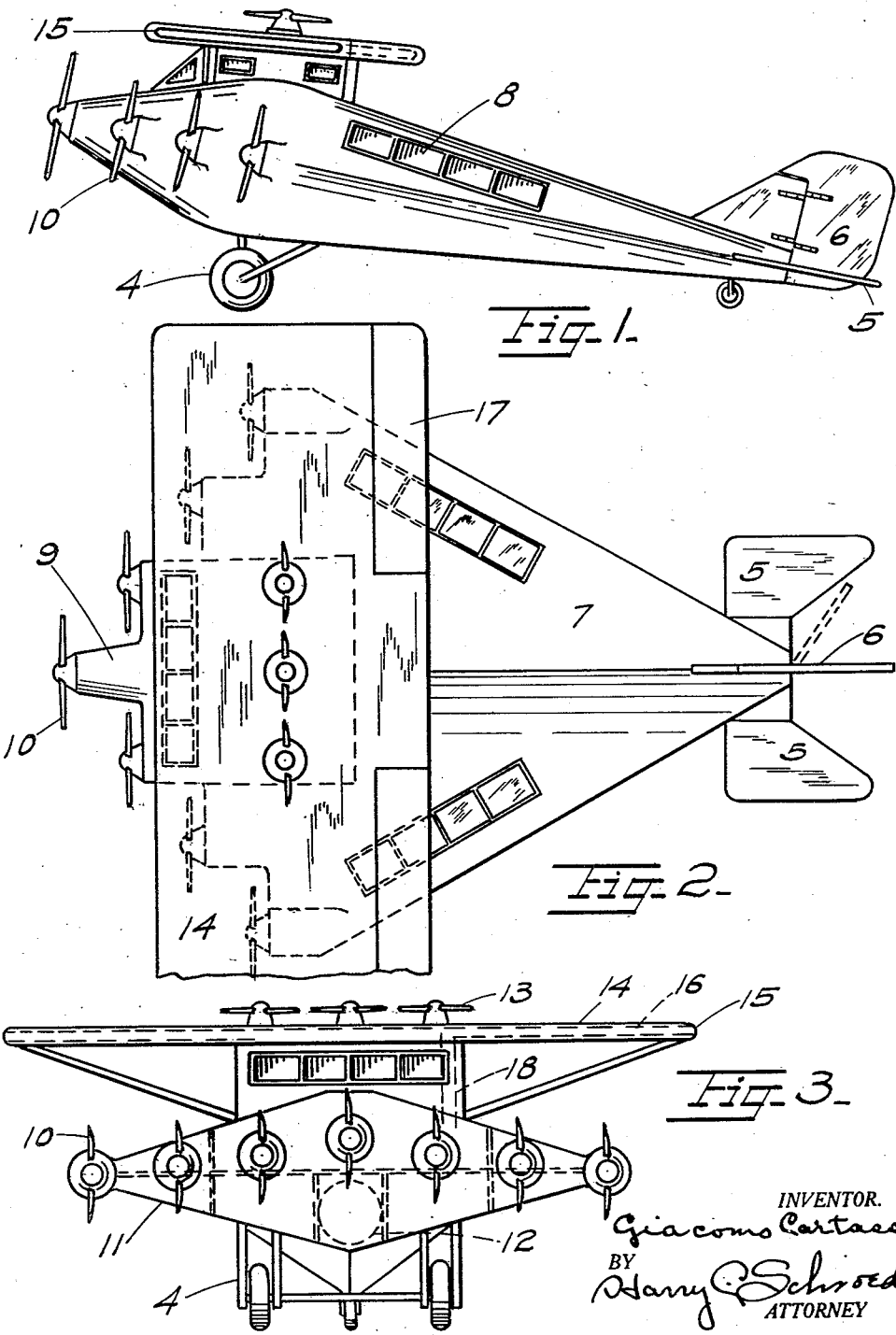

1,824,010

UNITED STATES PATENT OFFICE

GIACOMO CARTASSO, OF OAKLAND, CALIFORNIA

AIRCRAFT

Application filed February 25, 1930. Serial No. 431,070.

The invention is for a stratosphere helicopter aeroplane and has special reference to a combination monoplane and helicopter, the cabin of which is so constructed as to provide additional wing area, and due to the combination of aeroplane and helicopter provides an absolute ceiling above the region of the upper inversion of the isothermal layer.

The object of the invention is to provide a helicopter aeroplane, which, by coincident operation of the lifting and tractor propellers may be quickly brought to a high altitude after which the aircraft may be permitted to glide to a distant destination with or without cooperation of the tractor propellers.

Another object of the invention is to so construct the cabin as to provide additional wing area and to permit the craft to land on water when the necessity arises.

A further object of the invention is to provide means for directing the heated air from the motors through the wings to prevent formation of ice thereon when subjected to the sub-zero temperatures of and below the isothermal layer, and the storage of oxygen for use in the rarefied upper strata of the atmosphere for motors and occupants of the craft.

With these and other objects in view which will be apparent from the description as set forth and from the appended claim, the invention resides in the combination of parts and their application as illustrated in the drawings, in which Fig. 1 is a longitudinal elevation of the invention;

Fig. 2 is a top plan view; and

Fig. 3 is a front elevation of the aircraft.

Similar character references are used to designate similar parts throughout the several views.

The aircraft comprises the usual landing gear 4, elevators 5, and rudder 6. A fuselage 7 of special construction is provided with a cabin 8 and presents a stream line contour in elevation. Motors 9 are disposed at the forward end of the fuselage and equipped with the usual propellers 10. The bottom 11 of the fuselage tapers upwardly from the center forming in substance a keel at the center, and is made seaworthy to permit of landing the craft on water. A fuel tank 12 is centrally disposed relative to the fuselage and oxygen tanks are placed as found convenient in the motor compartments. Vertically disposed motors are provided with propellers 13 for lifting the craft. The wings 14 are provided with slots 15 at their outer ends and a passageway 16 for passage of the heated air from the motor compartment therethrough for the purpose of preventing the formation of ice on the wing surfaces. The usual ailerons 17 are provided.

The intention with the present device is to operate all motors at take off, quickly gaining altitude by means of the propellers 13 until the stratosphere is reached and possibly continuing beyond the region of the upper inversion thereof, then stopping the helicopter propellers 13, and if exceptional speed is desired, nosing the plane slightly toward the earth, obtaining a gliding effect in addition to the normal forward travel due to the propellers 10. The heated air from the motor compartment passes upward through passages 18 and thence through the passageways 16 in the wings and out of the wing tips 15, thereby keeping the wings 14 warm and preventing ice forming on the surface of the wings in the sub-zero temperatures encountered in the higher air strata and especially the stratosphere.

The exact altitude to which the plane will be raised will depend on the prevailing winds, the advantage of which is to be taken for increasing the speed of travel. A supply of oxygen will be available and used as necessity demands for both motors and human consumption. Should necessity demand the landing of the craft on water, the displacement of the hull section would be sufficient to keep the craft afloat.

I am aware that combination aeroplane and helicopters have been made, and that oxygen has been carried in planes for use in high altitudes, therefore I do not claim such combinations broadly, but I do claim:

A helicopter aeroplane provided with a fuselage of substantially equi-lateral triangular form in plan, the apex constituting the tail, and a plurality of forwardly stepped motor housings extending forwardly from the base thereof, a cross-section of said fuselage being of substantially diamond form, tapering uniformly forwardly and rearwardly, and a wing structure adapted to receive heated air from said fuselage, and openings in the tips of said wings for escape of said heated air.

In testimony whereof I have affixed my signature.

GIACOMO CARTASSO.